US012806944B2

(12) United States Patent
Ritchey et al.

(10) Patent No.: US 12,806,944 B2
(45) Date of Patent: Nov. 24, 2026

(54) LOCK PLATE

(71) Applicant: White Mule Company, Ontario, OH (US)

(72) Inventors: Larry Steven Ritchey, Mansfield, OH (US); Andrew Patrick Ritchey, Mansfield, OH (US)

(73) Assignee: White Mule Company, Ontario, OH (US)

( * ) Notice: Subject to any disclaimer, the term of this patent is extended or adjusted under 35 U.S.C. 154(b) by 259 days.

(21) Appl. No.: 18/750,322

(22) Filed: Jun. 21, 2024

(65) Prior Publication Data

US 2025/0001818 A1 Jan. 2, 2025

Related U.S. Application Data

(60) Provisional application No. 63/510,773, filed on Jun. 28, 2023.

(51) Int. Cl.
*B60D 1/14* (2006.01)
*B60P 3/06* (2006.01)

(52) U.S. Cl.
CPC . *B60D 1/14* (2013.01); *B60P 3/06* (2013.01)

(58) Field of Classification Search
CPC . B60D 1/14; B60P 3/06; F16B 39/103; F16B 39/108
See application file for complete search history.

(56) References Cited

U.S. PATENT DOCUMENTS

| | | | | | | |
|---|---|---|---|---|---|---|
| 917,530 | A | * | 4/1909 | Boyce | F16B 39/108 | 411/123 |
| 999,606 | A | * | 8/1911 | Stillwell | F16B 39/10 | 411/984 |
| 1,088,515 | A | * | 2/1914 | Bazin | F16B 39/10 | 411/986 |
| 1,261,616 | A | * | 4/1918 | Reinicker | F16B 39/10 | 184/48.1 |
| 1,344,684 | A | * | 6/1920 | Eisenhart | F16B 39/10 | 411/130 |
| RE15,379 | E | * | 6/1922 | Bechberger | F16B 39/32 | 411/197 |

(Continued)

*Primary Examiner* — Valentin Neacsu
*Assistant Examiner* — Michael R Stabley
(74) *Attorney, Agent, or Firm* — Jacob M. Ward; Ward Law Office LLC

(57) ABSTRACT

A coupling system for a bolster and a clamp assembly of a saddle-mount. The coupling system includes an externally threaded member and an internally threaded member configured to threadably engage the externally threaded member. A lock plate includes an anti-rotation feature, an aperture to receive the externally threaded member, and a slot extending from an edge of the aperture. A receiving member is configured to abut the lock plate and receive the externally threaded member, wherein the receiving member is one of the bolster and the clamp assembly of the saddle-mount. A split lock washer is disposed on the externally threaded member and positioned between the lock plate and one of a head of the externally threaded member and the internally threaded member. The split lock washer cooperates with the lock plate to militate against a rotation of the externally threaded member with respect to the internally threaded member.

18 Claims, 6 Drawing Sheets

(56) References Cited

U.S. PATENT DOCUMENTS

| | | | | |
|---|---|---|---|---|
| 6,976,817 | B1 * | 12/2005 | Grainger | F16B 39/103<br>411/329 |
| 8,784,027 | B2 * | 7/2014 | Hess | F16B 39/32<br>411/326 |
| 10,619,663 | B2 * | 4/2020 | Buchanan | F16B 35/041 |
| D986,047 | S | 5/2023 | Ritchey et al. | |
| 2005/0025604 | A1 * | 2/2005 | Slesinski | F16B 39/108<br>411/112 |
| 2015/0139749 | A1 * | 5/2015 | Metten | F16B 5/025<br>411/114 |
| 2022/0194150 | A1 | 6/2022 | Ritchey et al. | |
| 2024/0110590 | A1 * | 4/2024 | Yang | F16B 39/10 |

* cited by examiner

LOCK PLATE

CROSS-REFERENCE TO RELATED APPLICATIONS

This application claims the benefit of U.S. Provisional Application No. 63/510,773, filed on Jun. 28, 2023. The entire disclosure of the above application is incorporated herein by reference.

FIELD

The present disclosure relates generally to devices for the transportation of vehicles and, more particularly, to a lock plate for use with a saddle-mount for coupling multiple vehicles together for transport.

INTRODUCTION

This section provides background information related to the present disclosure which is not necessarily prior art.

Devices for coupling vehicles together for purposes of either towing a disabled vehicle or for shuttling vehicles between multiple locations are known. Conventionally, a saddle-mount is designed to couple a lead vehicle to a towed vehicle or a combination of vehicles. In truck applications, the saddle-mount is mounted to either a fifth wheel, or to the frame of the lead truck. The saddle-mount is then generally coupled to the front axle of the towed vehicle, such that the front axle of the towed vehicle is lifted from the ground, and the towed truck rolls on the rear wheels only. Alternatively, multiple saddle-mounts may be used in any combination to attach additional trucks. Up to three saddle-mounts may be used to transport a maximum of four trucks in total, for example.

The saddle-mount is typically designed to facilitate being attached to the lead vehicle and may also include a clamp assembly that is generally configured to facilitate the coupling of the front axle to the saddle-mount. An example of such a saddle-mount and a clamp assembly is shown in U.S. Patent Application Publication No. 2022/0194150A1 titled TRUCK SADDLE-MOUNTS WITH J-CLAMP, incorporated herein by reference in its entirety.

It is important that the saddle-mount be securely attached to the lead vehicle and maintain the secured attachment during operation. The saddle-mount may be attached to the lead vehicle using threaded fasteners such as U-bolts, for example. A split lock washer may be employed to militate against a relative movement between the threaded components of the threaded fasteners. However, it has been observed that the current practice is to use a combination of a single split lock washer with multiple flat washers. This practice prevents the split lock washer from doing its job of militating against relative movement between the threaded components of the threaded fasteners thereby reducing their ability to maintain the secure attachment to the lead vehicle during operation. Specifically, the lock washer only locks the fastener to the first flat washer thereby completely negating the purpose of the lock washer to militate against relative movement between the threaded components of the threaded fasteners.

It is also important that the clamp assembly achieve a desired clamping force on the towed vehicle and maintain the desired clamping force during operation. The clamping force from the clamp assembly is typically created using cooperating internally and externally threaded components, such as a J-bolt and nut, or straight bolt and J-clamp for example. In order to maintain the desired clamping force, a split lock washer may be employed to militate against a relative movement between the threaded components and a loosening of the clamp assembly. However, it has been found that over time and after multiple uses, the clamp assembly may be damaged by the split lock washer which may result in the need to replace the clamp assembly. Additionally, it has been observed that the current practice used to prevent damage to the clamp assembly is to use a combination of a single split lock washer with multiple flat washers. This practice prevents the split lock washer from doing its job of militating against relative movement between the threaded components of the threaded fasteners thereby reducing their ability to maintain the desired clamping force during operation. Specifically, the lock washer only locks the fastener to the first flat washer thereby completely negating the purpose of the lock washer to militate against relative movement between the threaded components of the threaded fasteners.

Accordingly, there is a continuing need for a coupling system for a saddle-mount and a clamp assembly that may provide for a more secure attachment to both the lead vehicle and the towed vehicle and maintain the secure attachment to both the lead vehicle and the towed vehicle during operation.

SUMMARY

In concordance with the instant disclosure, a coupling system for a saddle-mount and a clamp assembly, has surprisingly been discovered.

In one embodiment, a coupling system may include a fastener, a lock plate, and a receiving member. The lock plate may have a contact surface, an aperture formed in the contact surface, a slot extending from the aperture, and an anti-rotation feature. The receiving member may be configured to abut the contact surface of the lock plate and receive the fastener, wherein the anti-rotation feature of the lock plate engages the receiving member and limits a rotation of the lock plate relative to the receiving member to less than three-hundred sixty degrees.

In another embodiment, a coupling system is provided for a saddle-mount having a bolster configured to be disposed on a towing vehicle, and a head assembly disposed on the bolster and having a clamp assembly configured to receive a vehicle to be towed. The coupling system may include an externally threaded member and an internally threaded member, the internally threaded member may be configured to threadably engage the externally threaded member. The coupling system may also include a lock plate, a receiving member, and a split lock washer. The lock plate may have a contact surface, an aperture formed in the contact surface to receive the externally threaded member, a slot extending from the aperture, and an anti-rotation feature. The receiving member may be configured to abut the contact surface of the lock plate and receive the externally threaded member. The anti-rotation feature of the lock plate may engage the receiving member and limit a rotation of the lock plate relative to the receiving member to less than three-hundred sixty degrees. The receiving member may be one of the bolster and the clamp assembly of the saddle-mount. The split lock washer may be disposed on the externally threaded member and positioned between the lock plate and one of a head of the externally threaded member and the internally threaded member. The split lock washer may cooperate with the lock plate to militate against a rotation of the externally threaded member with respect to the internally threaded member.

The present disclosure also provides a method of coupling a towed vehicle to a towing vehicle. The method may include providing a bolster configured to be disposed on the towing vehicle and providing a head assembly disposed on the bolster and having a clamp assembly configured to receive the towed vehicle. The method may also include providing a coupling system to facilitate securing the bolster to the towing vehicle and the towed vehicle to the clamp assembly. The coupling system may include a fastener, a lock plate, and a receiving member. The lock plate may have a contact surface, an aperture formed in the contact surface, a slot extending from the aperture, and an anti-rotation feature. The receiving member may be configured to abut the contact surface of the lock plate and receive the fastener, wherein the anti-rotation feature of the lock plate engages the receiving member and limits a rotation of the lock plate relative to the receiving member to less than three-hundred sixty degrees.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
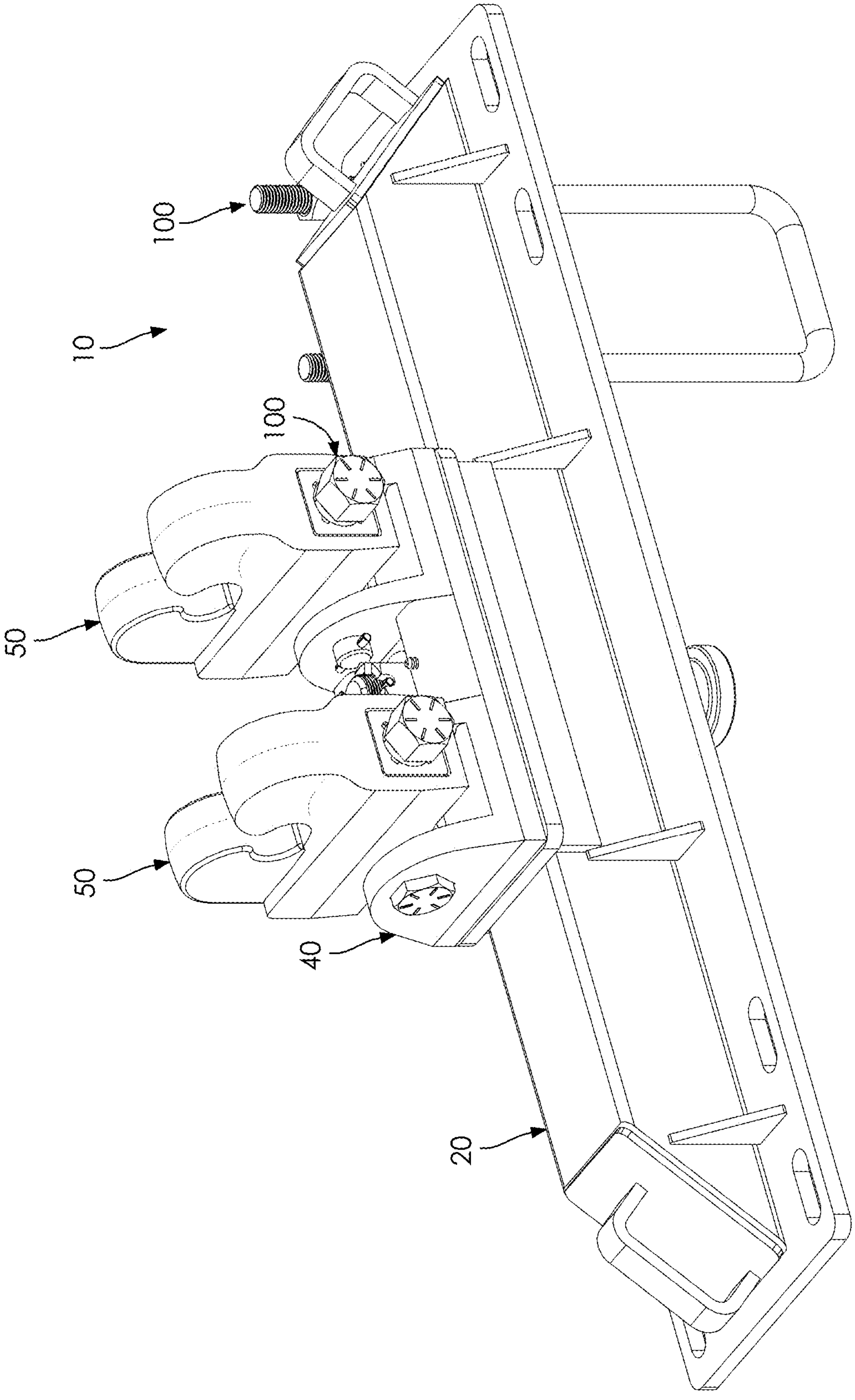
FIG. 1 is a top front perspective view of a saddle-mount including a coupling system having a lock plate, according to one embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps may be different in various embodiments, including where certain steps may be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

Figure 2:
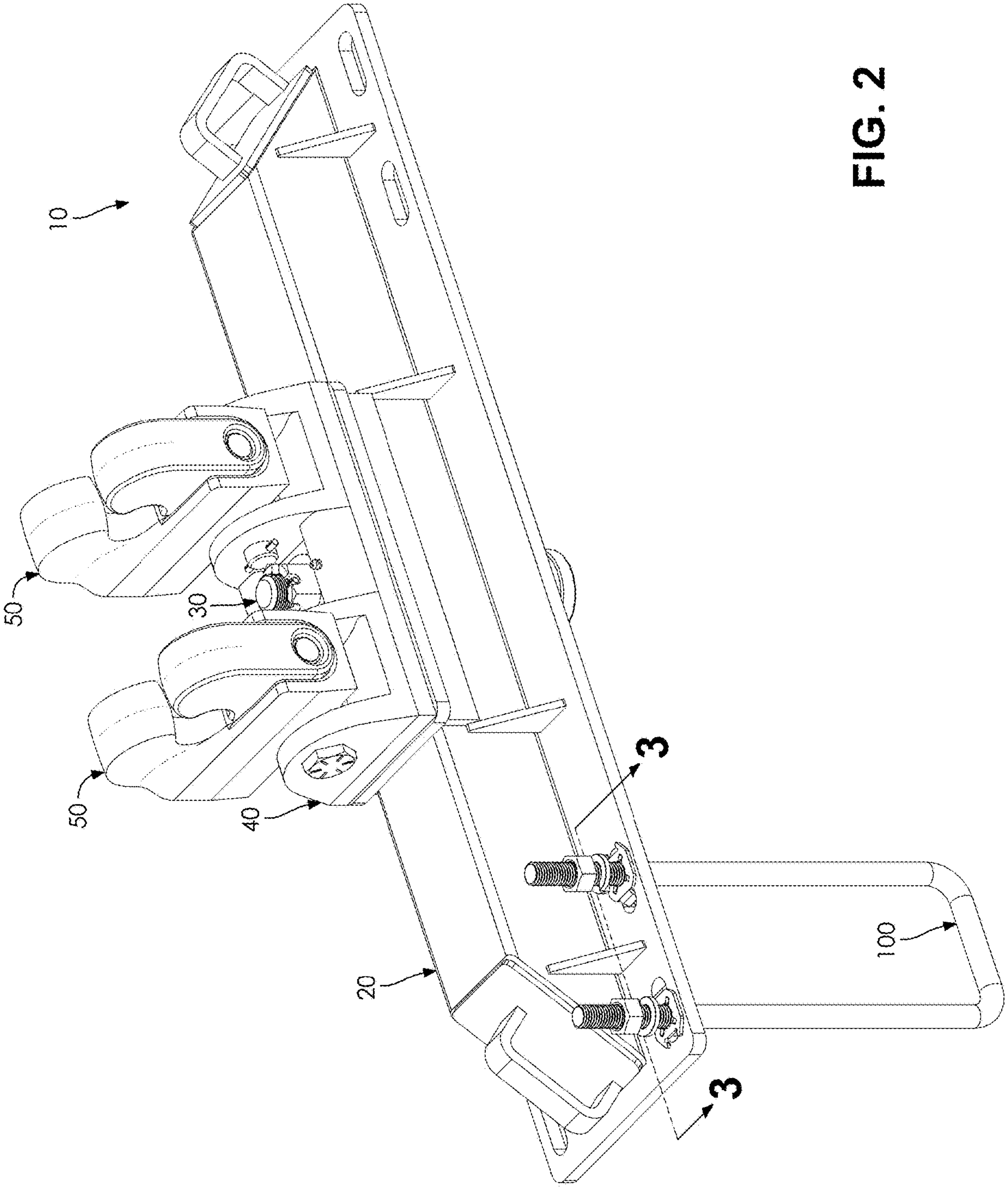
FIG. 2 is a top rear perspective view of the saddle-mount, shown in FIG. 1.
Figure 3:
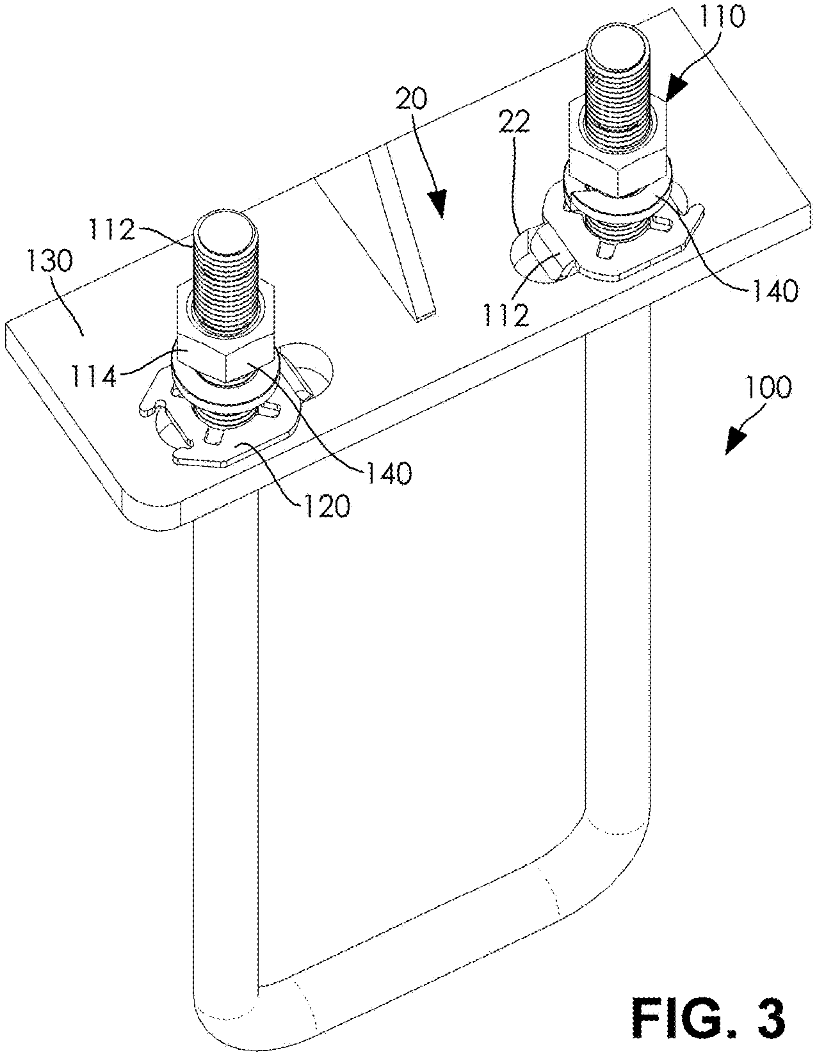
FIG. 3 is an enlarged fragmentary top rear perspective view of the saddle-mount and the coupling system of FIG. 2 taken along line 3-3.
Figure 4:
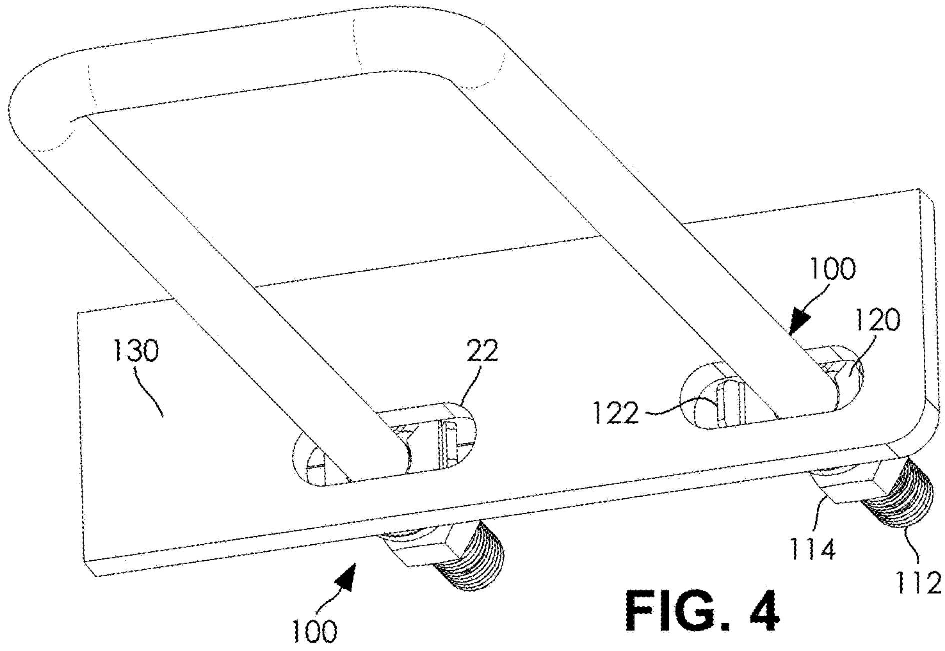
FIG. 4 is an enlarged fragmentary bottom rear perspective view of the saddle-mount and the coupling system of FIG. 2 taken along line 3-3.
Figure 5:
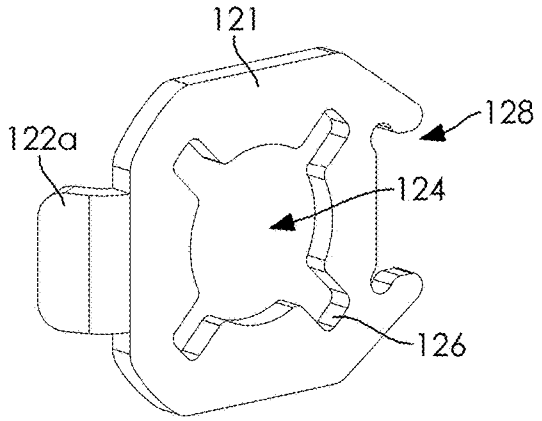
FIG. 5 is a top perspective view of the lock plate illustrated in FIGS. 3 and 4.
Figure 6:
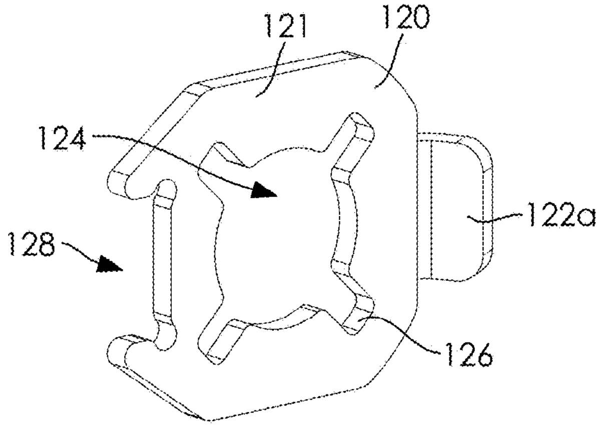
FIG. 6 is a bottom perspective view of the lock plate illustrated in FIG. 5.
Figure 7:
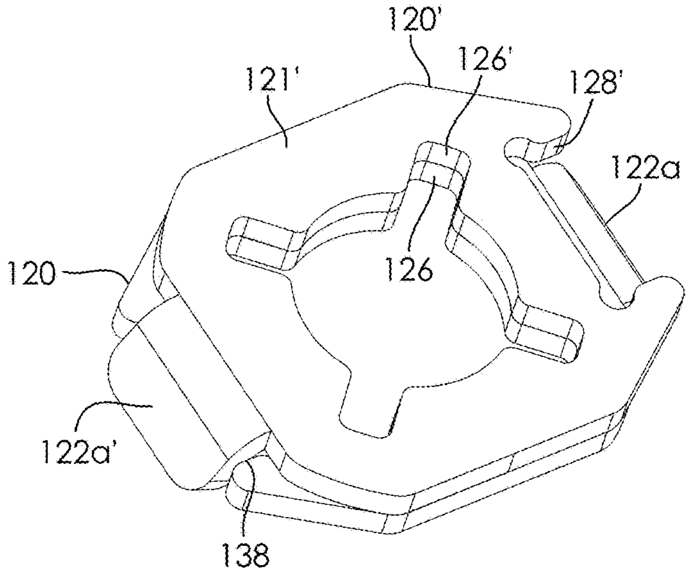
FIG. 7 is a top perspective view of two of the lock plates illustrated in FIGS. 5 and 6 in a stacked configuration.

FIGS. 1-15 show and describe a coupling system 100 for use with a saddle-mount 10, wherein the coupling system 100 may be used in the attachment of the saddle-mount 10 to a tow vehicle (not shown) and the attachment of a towed vehicle (not shown) to the saddle-mount 10, thus connecting the towed vehicle to the tow vehicle. FIGS. 1 and 2 show the saddle-mount 10 that includes a bolster 20 configured to be disposed on the towing vehicle, and a head assembly 40 disposed on the bolster 20 and having a clamp assembly 50 configured to receive the towed vehicle. A threaded stud 30 may be utilized to couple the head assembly 40, the bolster 20, and a fifth wheel pin of the saddle-mount 10.

The coupling system 100, according to certain embodiments of the present disclosure, is more clearly shown in FIGS. 3-15. The coupling system 100 may include a fastener 110, a split lock washer 140, a lock plate 120, and a receiving member 130 configured to abut the lock plate 120 and receive the fastener 110. In the illustrated embodiments, the receiving member 130 may be one of the bolster 20 and the clamp assembly 50 of the saddle-mount 10.

Figure 8:
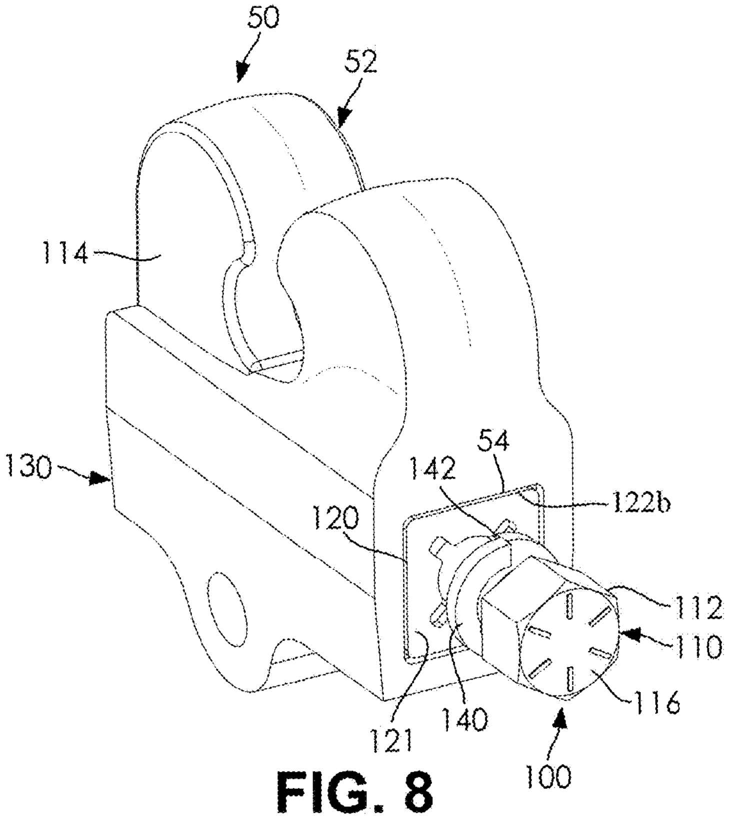
FIG. 8 is a top front perspective view of a clamp assembly of the saddle-mount illustrated in FIG. 1 showing a coupling system having a lock plate.

The fastener 110 may include an externally threaded member 112 and an internally threaded member 114. In the embodiment illustrated in FIGS. 3-4, the externally threaded member 112 is a U-bolt; in the embodiment illustrated in FIG. 8, the externally threaded member 112 is a straight bolt having a head 116; and in the embodiment illustrated in FIGS. 10 and 13, the externally threaded member 112 is a J-bolt wherein the j-shaped portion of the J-bolt functions as a moveable jaw 52 of the clamp assembly 50. Furthermore, the internally threaded member 114 may be a nut as shown in FIGS. 2, 3, 4, 10, and 13, or may be integrally formed in the moveable jaw 52 of the clamp assembly as shown in FIG. 8. The externally threaded member 112 and the internally threaded member 114 are configured to threadedly engage and cooperate with the receiving member 130 to create a clamping force, wherein the clamping forces are utilized to secure the saddle-mount 10 to the tow vehicle and the towed vehicle.

The lock plate 120 may have opposing contact surfaces 121 that may abut the receiving member 130 and split lock washer 140. The opposing contact surfaces 121 may be essentially free of any protrusions extending outwardly from the opposing contact surfaces 121 to facilitate contact of the opposing contact surfaces 121 with the receiving member 130 and split lock washer 140. The lock plate 120 may include an anti-rotation feature 122, an aperture 124, and a slot 126 extending from an edge of the aperture 124. As shown in FIGS. 3-7, in certain embodiments, the anti-rotation feature 122 may be a tab **122*a* configured to be received in an opening 22 in the receiving member 130, such as, for example, the opening 22 formed in the bolster 20 of the saddle-mount 10 as shown in FIGS. 1-4, wherein the tab 122*a* abuts a wall of the opening 22 and militates against a rotation of the lock plate 120 with respect to the receiving member 130. It should be understood that the anti-rotation feature 122 may be configured to limit a rotation of the lock plate relative to the receiving member to less than three-hundred sixty degrees and in certain embodiments minimize a rotation of the lock plate relative to the receiving member. The lock plate 120 shown in FIGS. 3-7 may include a recess 128 formed at a peripheral edge. The recess 128 may be configured to receive the tab 122*a*' of a second lock plate 120', wherein the tab 122*a*' abuts the recess 128 and militates against a rotation of the second lock plate 120' with respect to the lock plate 120. In this configuration, two or more of the lock plates 120 may be stacked on top of one another to provide a desired total thickness of the stack of lock plates 120 to achieve a desired distance between the receiving member 130 and the internally threaded member 114. Furthermore, the interaction of the recess 128 of one lock plate 120 with the tab 122*a* of another lock plate 120 mechanically locks together the stack of lock plates 120 enabling the split lock washer 140 to militate against a rotation of the externally threaded member 112 with respect to the internally threaded member 114 when such a stack of lock plates 120** is used.

Figure 9:
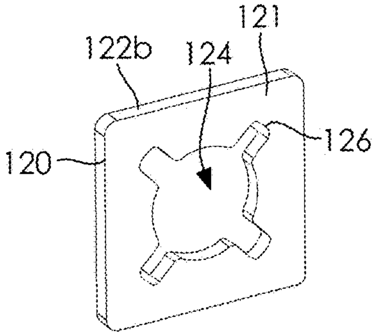
FIG. 9 is a top perspective view of the lock plate illustrated in FIG. 8.

Now referencing FIGS. 8-9, in certain embodiments, the anti-rotation feature 122 may be a non-round peripheral edge **122*b* received in a recess 54 of the receiving member 130, such as, for example, the square shaped peripheral edge of the lock plate 120 received in the square shaped recess of the clamp assembly 50. In this configuration, the non-round peripheral edge 122*b* of the lock plate 120 will abut an outer wall of the recess 54 which will militates against a rotation of the lock plate 120 with respect to the clamp assembly 50. It should be understood that shapes other than square shapes may be used for the non-round peripheral edge 122*b* of the lock plate 120 and the recess 54 of the clamp assembly 50, provided that the respective shapes do not permit the lock plate 120 to rotate more than three-hundred sixty degrees (360°) with respect to the recess 54. Furthermore, it should be understood that the anti-rotation feature 122 may be a round peripheral edge and the recess may be a round or a non-round recess, and a center of the aperture 124 in the lock plate 120 may be spaced apart from the center of the lock plate 120 providing an asymmetry in an axis of rotation of the lock plate 200 about an axis of the fastener 110 and/or the externally threaded member 112. In this configuration, the round peripheral edge of the lock plate 120 will abut an outer wall of the recess 54 which will militate against a rotation of the lock plate 120 with respect to the clamp assembly 50, provided that the respective shapes of the lock plate 120 and the recess 54 do not permit the lock plate 120 to rotate 360 degrees with respect to the recess 54**.

Figure 10:
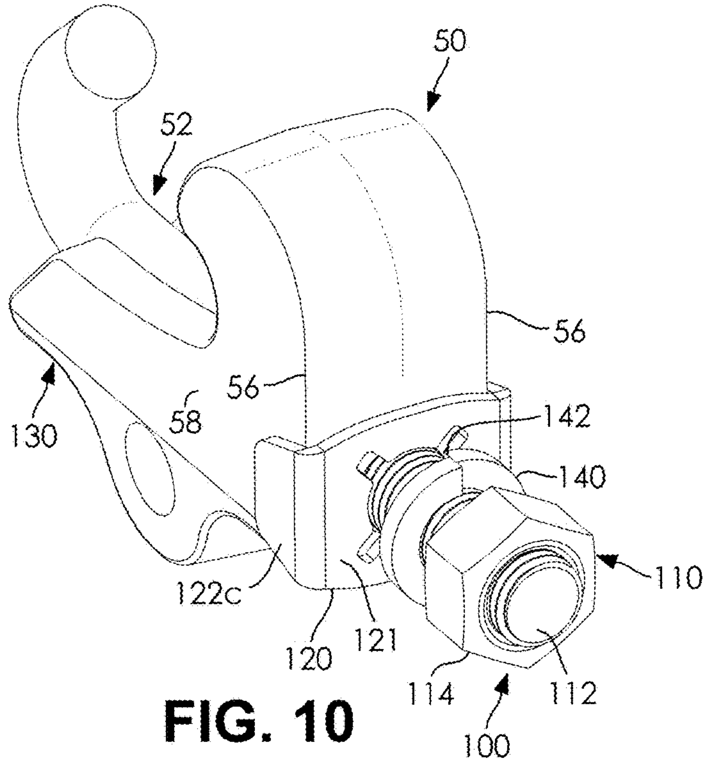
FIG. 10 is a top front perspective view of a clamp assembly and a lock plate according to another embodiment of the present disclosure.
Figure 11:
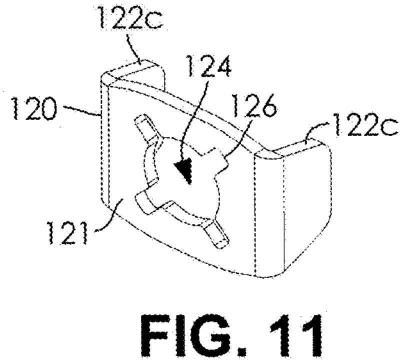
FIG. 11 is a top perspective view of the lock plate illustrated in FIG. 10.
Figure 12:
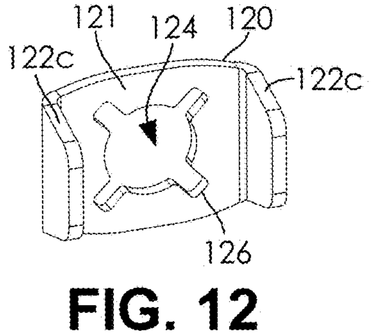
FIG. 12 is a bottom perspective view of the lock plate illustrated in FIG. 10.

With reference to FIGS. 10-12, in certain embodiments, the anti-rotation feature 122 of the lock plate 120 may be a protrusion **122*c* configured to wrap an edge of the receiving member 130. In this illustrated embodiment, the receiving member 130 is the clamp assembly 50 and the protrusion 122*c* is configured as two protrusions wrapping opposing edges of the clamp assembly 50. In operation, the protrusion 122*c* wraps the edges 56 and abuts the edges 56 and/or a side surface 58 of the clamp assembly 50 which militates against a rotation of the lock plate 120 with respect to the clamp assembly 50**.

Figure 13:
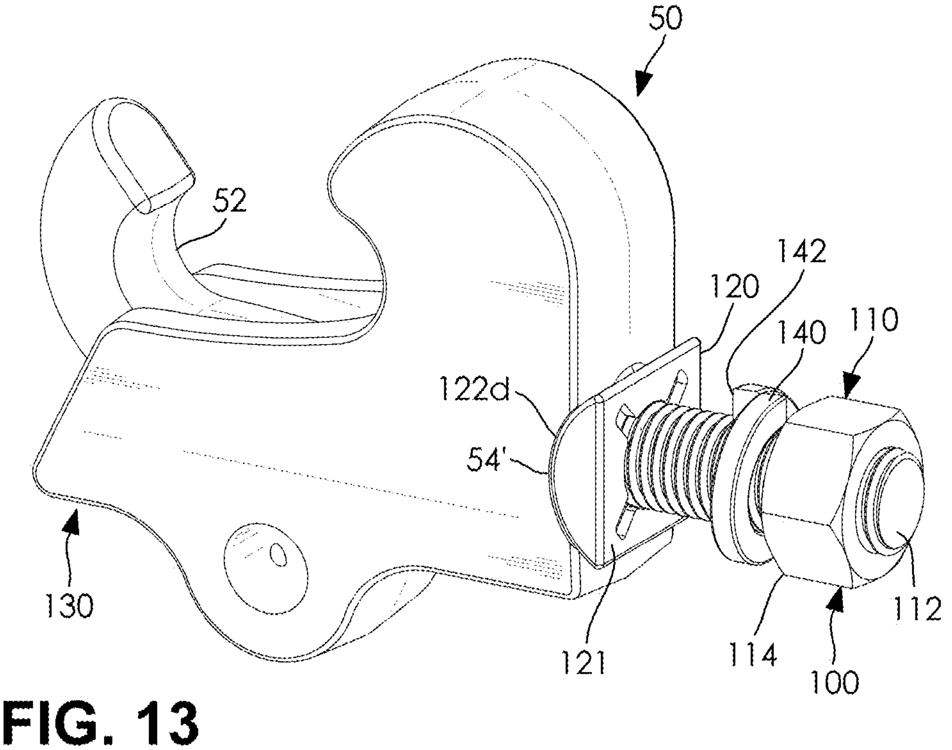
FIG. 13 is a top front perspective view of a clamp assembly and a lock plate according to another embodiment of the present disclosure.
Figure 14:
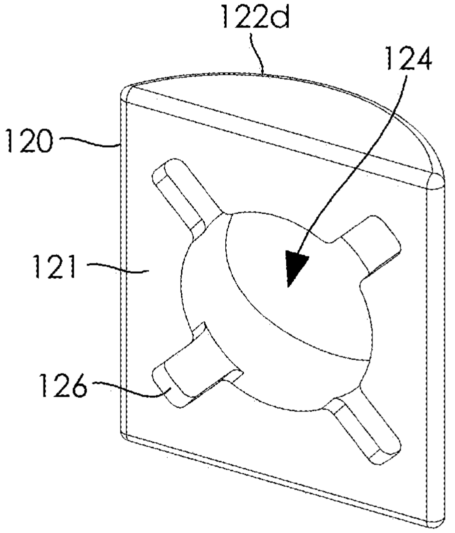
FIG. 14 is a top perspective view of the lock plate illustrated in FIG. 13.
Figure 15:
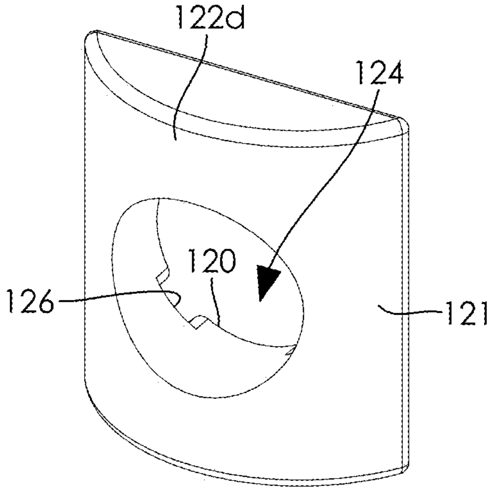
FIG. 15 is a bottom perspective view of the lock plate illustrated in FIG. 13.

Now referencing FIGS. 13-15, in certain embodiments, the anti-rotation feature 122 may include a non-flat surface projecting from the lock plate 120, such as a curved or rounded surface, which may be received in a complementary non-flat recess (e.g., curved or rounded recess) of the receiving member 130. For example, the non-flat surface **122*d* of the lock plate 120 may be received in the non-flat recess 54' of the clamp assembly 50, as shown in FIG. 13. The opposing contact surfaces 121 that may abut the receiving member 130 and the split lock washer 140 may therefore include the non-flat surface 122*d* (e.g., rounded surface) facing and cooperating with the non-flat recess 54' (e.g., rounded recess) of the clamp assembly 50 and a flat surface facing the lock washer 140. In this configuration, the rounded surface 122*d* of the lock plate 120 may abut an outer wall of the rounded recess 54' which militates against a rotation of the lock plate 120 with respect to the clamp assembly 50**.

Furthermore, the configuration illustrated in FIGS. 13-15 may facilitate a pivoting of the externally threaded member 112 with respect to the receiving member 130 while maintaining the flat surface facing the lock washer 140 substantially perpendicular to a longitudinal axis of the externally threaded member 112. By facilitating the pivoting of the externally threaded member 112 and maintaining the flat surface facing the lock washer 140 substantially perpendicular to the longitudinal axis of the externally threaded member 112, non-axial loads acting on the externally threaded member 112 may be minimized. Accordingly, the position of the externally threaded member 112 may self-adjust to minimize non-axial loads acting on the externally threaded member 112 as the externally threaded member 112 and the internally threaded member 114 threadedly engage with the receiving member 130 to create the clamping force.

The aperture 124 may be located in the center area of the lock plate 120. The aperture 124 is configured to receive the externally threaded member 112 of the fastener 110. The slot 126 extends from an edge of the aperture 124 and terminates at a closed end located between the edge of the aperture 124 and an outer edge of the lock plate 120. It should be understood that the aperture 124 may be located away from the center area of the lock plate 120 to provide an asymmetry in an axis of rotation of the lock plate 120 about an axis of the fastener 110 and or the externally threaded member 112.

The split lock washer 140 cooperates with the lock plate 120 to militate against a rotation of the externally threaded member 112 with respect to the internally threaded member 114. An edge 142 of the split lock washer 140 may be received, at least partially, in the slot 126 of the lock plate 120, wherein the edge 142 of the split lock washer 140 abuts a wall or an edge of the slot 126 and militates against a rotation of the split lock washer 140 with respect to the lock plate 120. In one embodiment illustrated in FIGS. 3-6, the split lock washer 140 may be disposed between the lock plate 120 and the internally threaded member 114. Now referencing FIGS. 8-9, in this illustrated embodiment, the split lock washer 140 may be disposed between the lock plate 120 and the head 116 of the externally threaded member 112. With reference to FIGS. 10-15, in two additional embodiments, the split lock washer 140 may be disposed between the lock plate 120 and the internally threaded member 114.

In use, the lock plate 120 of the coupling system 100 provides a non-moving/non-rotating member that abuts the receiving member 130. The lock plate 120 prevents moving/rotating parts of the coupling system 100 from contacting an outer surface of the receiving member 130. The current practice is to use a combination of a single split lock washer, multiple flat washers and a threaded fastener which result in one of the threaded fastener, flat washer, or split lock washer being in rotational contact with the receiving member 130.

It should be understood that the receiving member 130 is typically used multiple times over its service life wherein the coupling system 100 is received, tightened and then later loosened and/or removed on numerous occasions. Over time, the repeated rotational contact from standard threaded fasteners, flat washers, and split lock washers, may wear and/or degrade the outer surface of the receiving member 130. The wear and/or degradation may result in the need to replace the receiving member 130. The current practice used to prevent wear and/or degradation the outer surface of the receiving member 130 is to use a combination of a single split lock washer with multiple flat washers which, result in one of the threaded fastener, flat washer, or split lock washer being in rotational contact with the receiving member 130. Accordingly, the coupling system 100 of the present disclosure that includes the lock plate 120 substantially prevents any rotational contact between the split lock washer 140 and the outer surface of the receiving member 130 and thus, minimizes rotational related wear and/or degradation to the outer surface of the receiving member 130. If damaged, the lock plate 120, a consumable item, may be replaced easily, quickly, and inexpensively as compared to replacing the entire receiving member 130, especially when the receiving member 130 is a substantial assembly or component of an assembly such as the bolster 20 and the clamp assembly 50 of the saddle-mount 10 illustrated herein. Furthermore, wrenches and other like tools are typically employed to tighten and loosen the coupling system 100. The lock plate 120 militates against the wrenches or other tools from contacting and wearing, degrading, or damaging the receiving member 130 during the tightening and loosening processes.

Additionally, the coupling system 100 provides for improved attachment to the receiving member 130, and, in the illustrated embodiment, the secure attachment of the saddle-mount to the tow vehicle and the towed vehicles. The use of the lock plate 120 in cooperation with the other components of the coupling system 100 facilitates maintaining a desired torque for the fastener 110 as the relative rotational movement between the externally threaded member 112 and the internally threaded member 114 is minimized along with the relative rotational movement of the fastener 110, lock plate 120, and split lock washer 140 with respect to the receiving member 130.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods may be made within the scope of the present technology, with substantially similar results.

What is claimed is:

1. A coupling system comprising:
- a fastener including an internally threaded member and an externally threaded member;
- a lock plate having a contact surface, an aperture formed in the contact surface, a slot extending from the aperture, and an anti-rotation feature;
- a receiving member configured to abut the contact surface of the lock plate and receive the fastener, wherein the anti-rotation feature of the lock plate engages the receiving member and limits a rotation of the lock plate relative to the receiving member to less than three-hundred sixty degrees; and
- a split lock washer disposed between the lock plate and one of the internally threaded member and the externally threaded member, the split lock washer cooperating with the lock plate to militate against a rotation of the internally threaded member relative to externally threaded member.

2. The coupling system of claim 1, wherein the externally threaded member is selected from a group consisting of a U-bolt, a straight bolt, and a J-bolt.

3. The coupling system of claim 1, wherein an edge of the split lock washer is received in the slot of the lock plate.

4. The coupling system of claim 1, wherein the anti-rotation feature includes a protrusion configured to be disposed around an edge of the receiving member, the protrusion abutting the receiving member to militate against a rotation of the lock plate with respect to the receiving member.

5. The coupling system of claim 1, wherein the anti-rotation feature includes a non-flat surface received in a non-flat recess of the receiving member, the non-flat surface abutting the non-flat recess of the receiving member to militate against a rotation of the lock plate with respect to the receiving member.

6. A coupling system comprising:
- a fastener;
- a lock plate having a contact surface, an aperture formed in the contact surface, a slot extending from the aperture, and an anti-rotation feature; and
- a receiving member configured to abut the contact surface of the lock plate and receive the fastener, wherein the anti-rotation feature of the lock plate engages the receiving member and limits a rotation of the lock plate relative to the receiving member to less than three-hundred sixty degrees,
- wherein the anti-rotation feature includes a tab configured to be received in an aperture of the receiving member and abut the receiving member to militate against a rotation of the lock plate with respect to the receiving member.

7. The coupling system of claim 6, wherein a peripheral edge of the lock plate includes a recess configured to receive the tab of a second lock plate to facilitate a stacking of the second lock plate on top of the lock plate.

8. A coupling system comprising:
- a fastener;
- a lock plate having a contact surface, an aperture formed in the contact surface, a slot extending from the aperture, and an anti-rotation feature; and
- a receiving member configured to abut the contact surface of the lock plate and receive the fastener, wherein the anti-rotation feature of the lock plate engages the receiving member and limits a rotation of the lock plate relative to the receiving member to less than three-hundred sixty degrees,
- wherein the anti-rotation feature includes a peripheral edge received in a recess of the receiving member, the peripheral edge abutting an outer wall of the recess of the receiving member to militate against a rotation of the lock plate with respect to the receiving member.

9. The coupling system of claim 8, wherein the peripheral edge is a non-round peripheral edge.

10. A coupling system for a saddle-mount having a bolster configured to be disposed on a towing vehicle, and a head assembly disposed on the bolster and having a clamp assembly configured to receive a vehicle to be towed, the coupling system comprising:
- an externally threaded member;
- an internally threaded member configured to threadably engage the externally threaded member;
- a lock plate having a contact surface, an aperture formed in the contact surface to receive the externally threaded member, a slot extending from the aperture, and an anti-rotation feature;
- a receiving member configured to abut the contact surface of the lock plate and receive the externally threaded member, wherein the anti-rotation feature of the lock plate engages the receiving member and limits a rotation of the lock plate relative to the receiving member to less than three-hundred sixty degrees, the receiving member being one of the bolster and the clamp assembly of the saddle-mount; and a split lock washer disposed on the externally threaded member and positioned between the lock plate and one of a head of the externally threaded member and the internally threaded member, the split lock washer cooperating with the lock plate to militate against a rotation of the externally threaded member with respect to the internally threaded member.

11. The coupling system of claim 10, wherein the anti-rotation feature includes a tab configured to be received in an aperture of the receiving member and abut the receiving member to militate against a rotation of the lock plate with respect to the receiving member.

12. The coupling system of claim 11, wherein a peripheral edge of the lock plate includes a recess configured to receive the tab of a second lock plate to facilitate stacking of the second lock plate on top of the lock plate.

13. The coupling system of claim 10, wherein the anti-rotation feature includes a peripheral edge received in a recess of the receiving member, the peripheral edge abutting an outer wall of the recess of the receiving member to militate against a rotation of the lock plate with respect to the receiving member.

14. The coupling system of claim 13, wherein the peripheral edge is a non-round peripheral edge.

15. The coupling system of claim 10, wherein the anti-rotation feature includes a protrusion configured to be disposed around an edge of the receiving member, the protrusion abutting the receiving member to militate against a rotation of the lock plate with respect to the receiving member.

16. The coupling system of claim 10, wherein the anti-rotation feature includes a non-flat surface received in a non-flat recess of the receiving member, the non-flat surface abutting the non-flat recess of the receiving member to militate against a rotation of the lock plate with respect to the receiving member.

17. A method of coupling a towed vehicle to a towing vehicle comprising:

providing a bolster configured to be disposed on the towing vehicle;

providing a head assembly disposed on the bolster and having a clamp assembly configured to receive the towed vehicle; and providing a coupling system to facilitate securing the bolster to the towing vehicle and the towed vehicle to the clamp assembly, the coupling system including a fastener including an internally threaded member and an externally threaded member, a lock plate having a contact surface, an aperture formed in the contact surface, a slot extending from the aperture, and an anti-rotation feature, a receiving member configured to abut the contact surface of the lock plate and receive the fastener, wherein the anti-rotation feature of the lock plate engages the receiving member and limits a rotation of the lock plate relative to the receiving member to less than three-hundred sixty degrees, and a split lock washer disposed between the lock plate and one of the internally threaded member and the externally threaded member, the split lock washer cooperating with the lock plate to militate against a rotation of the internally threaded member relative to externally threaded member.

18. The method of claim 17, wherein the externally threaded member is configured to threadably engage the externally threaded member, the externally threaded member selected from a group consisting of a U-bolt, a straight bolt, and a J-bolt; and the anti-rotation feature of the coupling system is selected from a group consisting of a tab configured to be received in an aperture of the receiving member and abut the receiving member to militate against a rotation on the lock plate with respect to the receiving member, a peripheral edge received in a recess of the receiving member, the peripheral edge abutting the receiving member to militate against a rotation of the lock plate with respect to the receiving member, a protrusion configured to be disposed around an edge of the receiving member, the protrusion abutting the receiving member to militate against a rotation on the lock plate with respect to the receiving member, and a non-flat surface received in a non-flat recess of the receiving member, the non-flat surface abutting the non-flat recess of the receiving member to militate against a rotation of the lock plate with respect to the receiving member.

* * * * *